(No Model.)
W. S. CAMPBELL.
GOVERNOR FOR WIND WHEEL SHAFTS.
No. 382,950. Patented May 15, 1888.
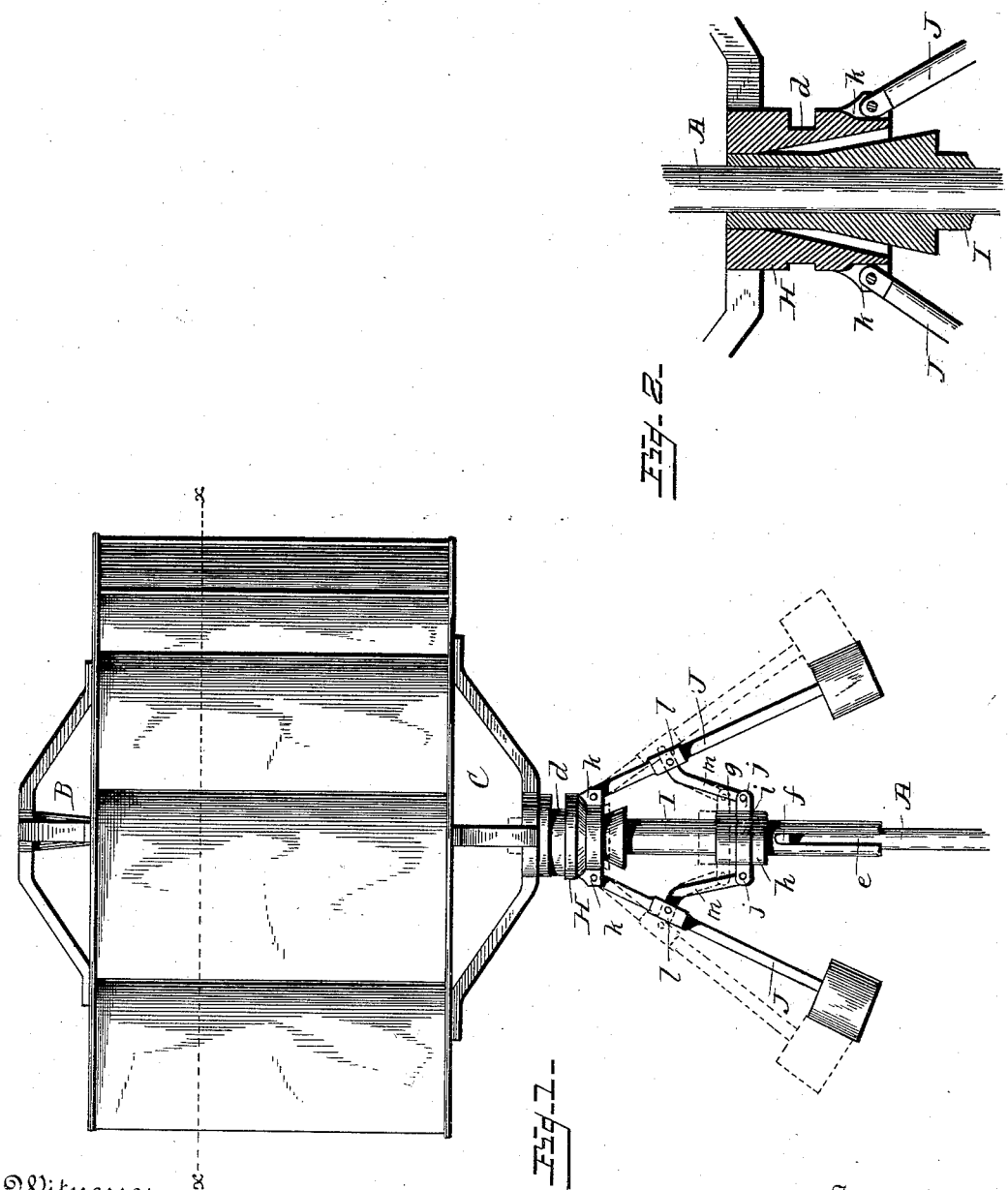

UNITED STATES PATENT OFFICE.

WAREHAM S. CAMPBELL, OF NEW BRITAIN, CONNECTICUT.

GOVERNOR FOR WIND-WHEEL SHAFTS.

SPECIFICATION forming part of Letters Patent No. 382,950, dated May 15, 1888.

Application filed December 16, 1887. Serial No. 258,053. (No model.)

*To all whom it may concern:*

Be it known that I, WAREHAM S. CAMPBELL, a citizen of the United States, residing at New Britain, in the county of Hartford and State of Connecticut, have invented certain new and useful Improvements in Brakes or Governors for Wind-Wheel Shafts; and I do hereby declare that the following is a full, clear, and exact description of the same, reference being had to the annexed drawings, making a part of this specification, and to the letters and figures of reference marked thereon.

This invention relates to certain new and useful improvements in brakes for wind-wheels, and has for its object to simplify and cheapen and render more durable and efficient in operation this class of devices.

The novelty resides in the peculiarities of construction, all as more fully hereinafter described, shown in the drawings, and then specifically pointed out in the claim.

In the accompanying drawings, which form a part of this specification, Figure 1 is a side elevation illustrating my improvement. Fig. 2 is a detail partly in section.

Referring now to the details of the drawings, A designates a suitable shaft having at its upper end a suitable bearing in the bracket or arms B, attached to the top of the wheel-case, and in a suitable bearing in the bracket or arms C, secured to the bottom of the wheel-case. This shaft does not revolve, but is stationary, and the wheel revolves on the shaft. The sails are proportioned to the size of the wheel, and may be made of wood, sheet-iron, or any other suitable material. Secured to and moving with the wheel, preferably attached to the lower bracket, C, is a sleeve, H, formed with an eccentric groove, $d$, as shown, from which the power is applied, when desired, in any well-known manner. The interior of this sleeve is conical, as shown in Fig. 2, and surrounding the shaft and vertically movable thereon is the sleeve I, the upper end of which works within the sleeve H and is tapered, as shown. The lower end of this sleeve I is formed with a slot, $e$, which engages a lug or projection, $f$, on the shaft, which prevents the said sleeve from turning on the shaft and yet allows it to move vertically thereon when desired. On the sleeve I are two fixed collars, $g$ $h$, between which is the loose collar $i$, provided with lugs $j$. At the lower end of the sleeve H are the lugs $k$, to which are pivoted the arms J, the free ends of which are weighted, as shown. Intermediate of their ends these arms are provided with enlargements $l$, to each of which is secured one of the ends of the links or rods $m$, the opposite ends of which are pivoted to the lugs $j$ of the collar $i$, as shown.

The operation is as follows: Wind entering the wheel between the sails strikes the same and causes the wheel to revolve. The collar H, the governor, and the collar $i$ revolve with the wheel. As the velocity of the wind increases, the speed of the wheel increases, causing the arms J to fly outward into the position shown in dotted lines in Fig. 1, thus drawing upward the sleeve I, the conical part of which engages the conical part of the sleeve H, and the friction caused thereby decreases the speed of the wheel, thus rendering the device automatic, the speed acting against itself and serving to regulate the motion of the wheel.

The device is simple, cheap, and durable, and avoids the necessity of the employment of tail-vanes, gearing, or other complicated accessories heretofore employed.

What I claim as new is—

The combination, with the stationary shaft and the rotary wheel, of the sleeve H, movable with the wheel and formed with eccentric groove $d$ and conical bore, the tapered sleeve I, vertically movable on the fixed shaft and formed at its lower end with a vertical slot engaging a lug on the shaft, the collars $g$ $h$ on the sleeve I, the loose collar $i$ on the shaft between said collars $g$ $h$ and formed with lugs $j$, the weighted arms J, pivoted at their upper ends to the lower end of the sleeve H, and the links $m$, pivoted at one end to the lugs $j$ of the loose collar and at the other end to the arms J intermediate their ends, substantially as shown and described, and for the purpose specified.

In testimony that I claim the above I have hereunto subscribed my name in the presence of two witnesses.

WAREHAM S. CAMPBELL.

Witnesses:
STEPHEN R. LAWRENCE,
WILLIAM HULTBERG.